May 1, 1962 J. G. KAY ET AL 3,032,160
CHUTING OF ADJUSTABLE WIDTH
Filed Jan. 4, 1960 2 Sheets-Sheet 1

INVENTORS
John G. Kay
James T. Graham
BY
Gerald Baldwin
ATTORNEY

May 1, 1962   J. G. KAY ET AL   3,032,160
CHUTING OF ADJUSTABLE WIDTH
Filed Jan. 4, 1960   2 Sheets-Sheet 2
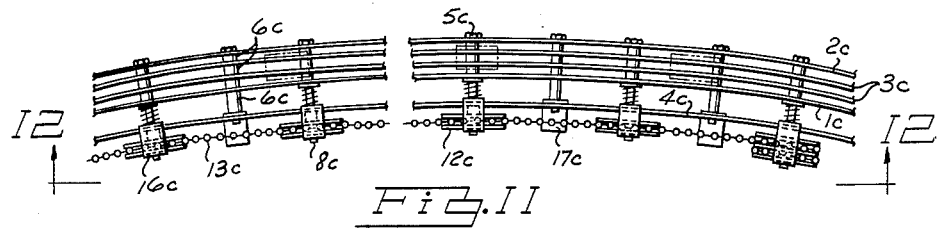
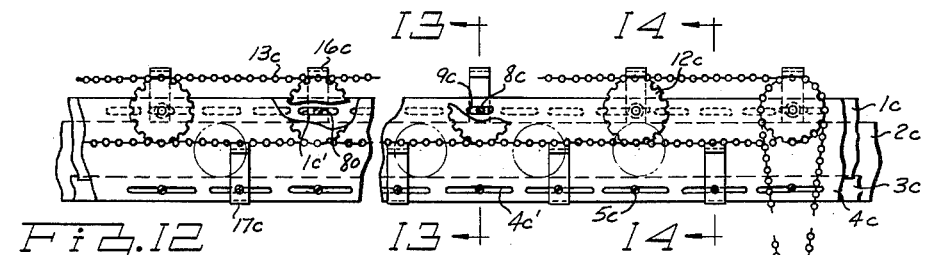
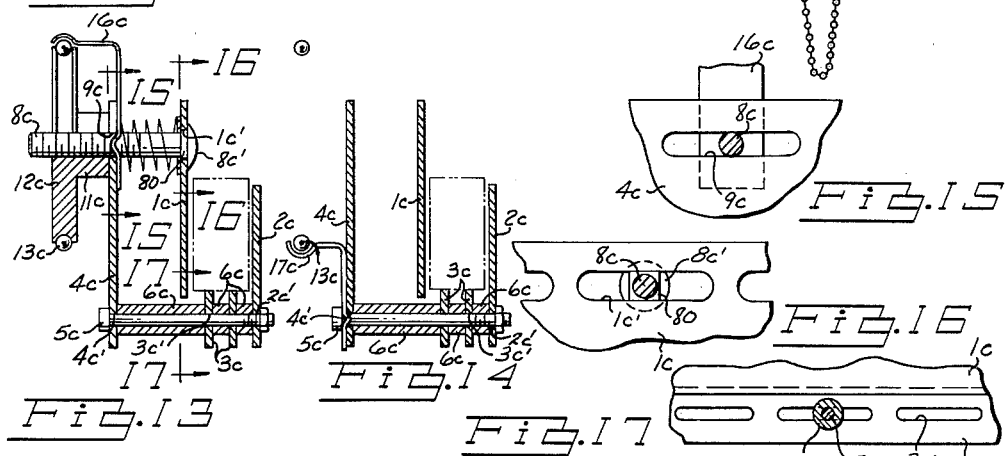
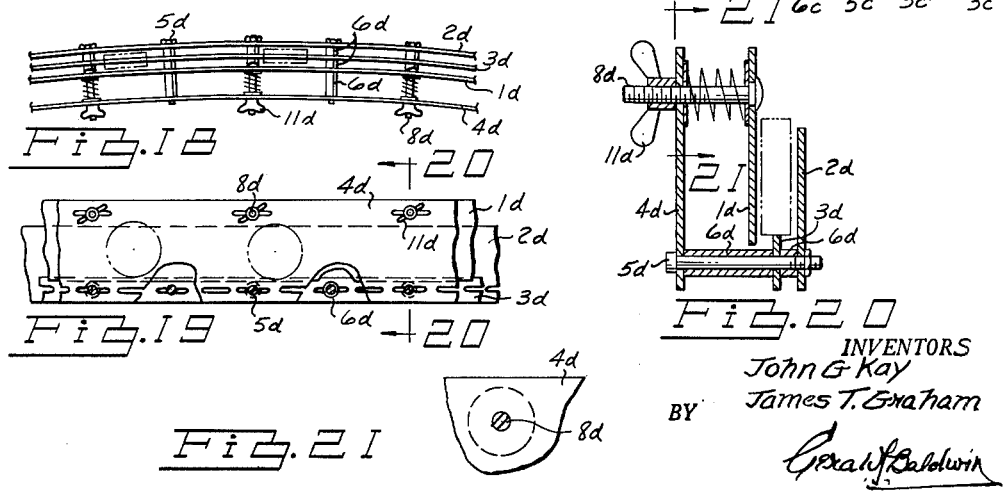
INVENTORS
John G. Kay
James T. Graham
BY
Gerald F. Baldwin
ATTORNEY

United States Patent Office 3,032,160
Patented May 1, 1962

3,032,160
CHUTING OF ADJUSTABLE WIDTH
John G. Kay, Detroit, and James T. Graham, Southfield Township, Oakland County, Mich., assignors to F. Jos. Lamb Company, Detroit, Mich., a corporation of Michigan
Filed Jan. 4, 1960, Ser. No. 100
4 Claims. (Cl. 193—38)

This invention relates to chuting of adjustable width. If the spacing between the guide rails on opposite sides of the chuting is materially greater than the width of the workpieces to travel along it unsatisfactory operation frequently results, due, for instance, to some of the workpieces suddenly starting to slide or roll along a path not quite in alignment with the chuting. Then their progress is quite liable to become impeded or halted by contact with one of the guide rails. On the other hand it often happens that a battery of machines is first tooled to produce workpieces of one width and subsequently to make other workpieces of a somewhat different width, it is therefore advantageous to be able to adjust the spacing between the opposite guide rails of the chuting along which workpieces pass from one machine to the next to the correct width to insure proper operation.

It is therefore an object of the invention to provide chuting wherein the guide rail on at least one side is laterally adjustable so that the spacing between the rails may be regulated.

Another object of the invention is to provide such chuting wherein the rails are made of resilient material, and means are provided for retaining any portion or the whole length of the chuting transversely curved.

A further object of the invention is to provide such chuting wherein, in one form, means are provided for simultaneously increasing or decreasing the spacing between the guide rails throughout their length.

Wtih these and other objects and advantages in view the invention is hereinafter more fully described with the aid of the accompanying drawings, in which:

FIGURE 1 is a plan view of straight chuting made according to the invention, and FIGURE 2 is a side view taken on the line 2—2 of FIGURE 1.

FIGURES 3 and 4 are enlarged sections on the lines 3—3 and 4—4, respectively, of FIGURE 2.

FIGURE 11 is a plan view of another modification of the invention, and

FIGURE 12 is a side elevation taken on the line 12—12 of FIGURE 11.

Figure 1:
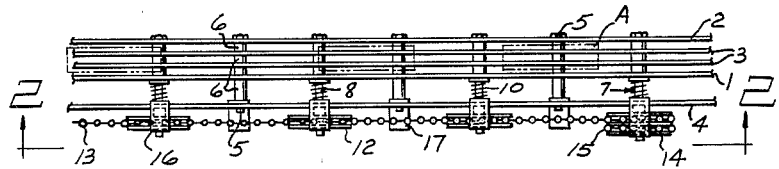
Figure 2:
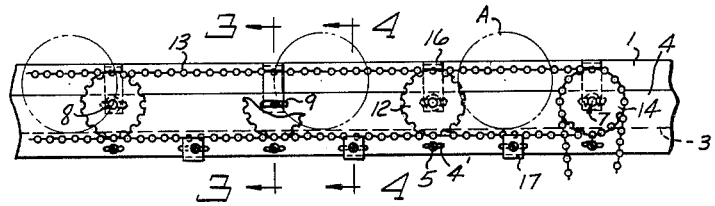
Figure 3:
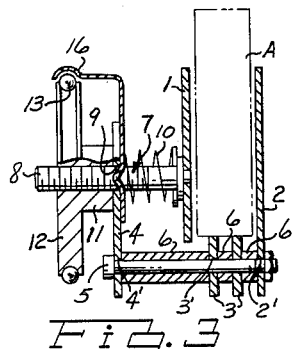
Figure 4:
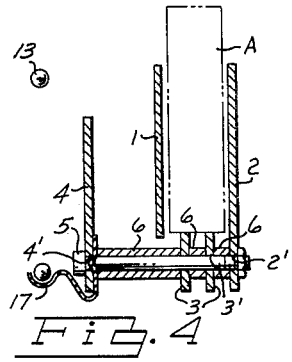

FIGURES 13 and 14 are enlarged sections on the lines 13—13 and 14—14, respectively, of FIGURE 12.

FIGURES 15, 16 and 17 are sections on the lines 15—15, 16—16 and 17—17, respectively, of FIGURE 13.

FIGURE 18 is a plan view of another modification of the invention, and

FIGURE 19 is a side view thereof.

FIGURE 20 is an enlarged section on the line 20—20 of FIGURE 19, and

FIGURE 21 is a section on the line 21—21 of FIGURE 20.

Referring to FIGURES 1 to 4, inclusive, the chuting includes two longitudinal guide rails 1 and 2 longitudinally between which carrier rails 3 extend, and also spaced outwardly from the guide rail 1 is a longitudinal supporting rail 4; moreover all these rails are preferably made of suitable resilient material such as spring steel. Extending through apertures 4', 3' and 2' formed through the supporting rail 4, the carrier rails 3 and the guide rail 2, respectively, at intervals throughout their length are suitable fastening means, such as bolts 5 which extend across the entire width of the chuting; and mounted on the bolts between each adjacent pair of rails are spacers 6 to retain the said rails in proper spaced relation. It will also be noted that the apertures are somewhat elongated to facilitate the insertion of the bolts therethrough. The bolts 5 and spacers 6 extend beneath and are clear of the guide rail 1 to permit its lateral adjustment in a manner hereafter described, and the upper extremities of the carrier rails 3 terminate at a lower elevation than the upper extremities of the guide rails 1 and 2 so that the latter retain workpieces A in line as they travel along the carrier rails. Extending laterally outward from the guide rail 1 are a plurality of longitudinally spaced holding and adjusting members 7 which engage the supporting member 4, carry the said guide rail, and permit its lateral adjustment to regulate its spacing from the guide rail 2. In order to obtain satisfactory operation the spacing between the guide rails must be only slightly greater than the width of the workpieces which are to travel between them, and by making the guide rail laterally adjustable provision is made for setting the spacing of the rails 1 and 2 to accommodate workpieces of different widths.

The supporting and adjusting means 7 is made as follows: Projecting outwardly at longitudinally spaced intervals from the guide rail 1 and held at one extremity against rotation thereby are threaded members 8 in the form of studs secured as by welding to the guide rail. The opposite extremities of the members 8 project through openings 9, preferably elongated openings, formed through the supporting rail 4. Mounted around each threaded member 8 and extending between the guide rail 1 and the supporting rail 4, and urging them apart, is a helical spring 10, and in threaded engagement with each member 8 and bearing against the outer face of the supporting rail is a nut 11 by which the spacing between the rails 4 and 1 is regulated. In this instance a sprocket wheel 12 is made integral with each nut 11, and extending around all the sprocket wheels 12 is an endless chain 13. Secured to and mounted for rotation coaxially with one of the sprocket wheels 12 is another sprocket 14 around which another endless chain 15 is dependingly arranged, so that by pulling one side or the other of the chain 15 all the sprocket wheels 12 and nuts 11 are rotated to adjust the spacing uniformly between the guide rails 1 and 2 throughout their length. 16 and 17 denote upper and lower retainers secured on the threaded members 8 and the bolts 5, respectively, to prevent detachment of the upper and lower strands of the chain 13 from the sprocket wheel 12. This form of the invention is usually employed in cases where the height of the chuting is such that it would not be easy to reach the threaded members themselves from the floor to adjust the setting of the guide rail 1; it also simplifies adjustment particularly in the case of long chuting, and insures retention of the guide rail 1 parallel with the guide rail 2 at all times.

Figure 7:
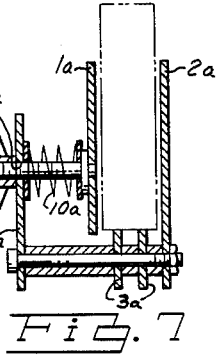
FIGURE 7 is an enlarged section on the line 7—7 of FIGURE 6.
Figures 5, 8:
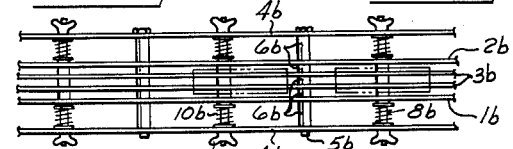
FIGURE 5 is a plan view showing a modification of the invention.
FIGURE 8 is a plan view showing another modification of the invention.
Figures 6, 9:
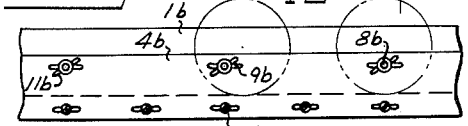
FIGURE 6 is a side elevation thereof.
FIGURE 9 is a side view thereof.

In the modification shown in FIGURES 5 to 7, inclusive, the mounting and arrangement of the supporting rail 4a, the guide rails 1a and 2a, and the carrier rails 3a are the same as shown in FIGURES 1 to 4, threaded members 8a project outwardly from the guide rail 1a through openings 9a in the supporting rail 4a, and springs 10a are again mounted on the members 8a between the rails 4a and 1a. However the sprockets are dispensed with and the spacing of the guide rail 1a from the supporting rail 4a, and thus from the guide rail 2a, is regulated by separate adjustment of thumb nuts 11a upon the threaded members 8a to compress or relax the springs 10a.

Figure 10:
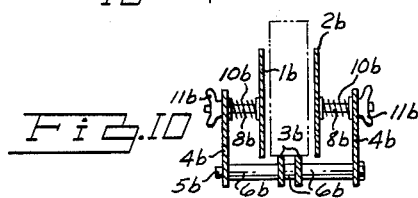
FIGURE 10 is a section on the line 10—10 of FIGURE 9.

In the modification shown in FIGURES 8 to 10, inclusive, supporting rails 4b are provided one on each side of the chuting, and are held in spaced relation relative to the carrier rails 3b between them by bolts 5b having spacers 6b thereon between each adjacent pair of rails. Again threaded members 8b project outward from the guide rail 1b and in this case other threaded members 8b project outwardly from the guide rail 2b. The threaded members 8b extend through openings 9b in the supporting rails and have thumb nuts 11b on their outer extremities to compress or relax springs 10b on the said members. Thus separate lateral adjustment is provided for each guide rail 1b and 2b so that a greater range of spacing may be obtained between them, and consequently the chuting may be satisfactorily employed for handling workpieces of a greater range of widths.

In the modification shown in FIGURES 11 to 17, inclusive, the guide rails 1c and 2c, the carrier rails 3c and the supporting rail 4c, which are all made of suitable resilient material, are flexed so that the chuting is held in any desired transversely curved form. The openings 4c', 3c' and 2c' through which the bolts 5c extend are longitudinally elongated to permit passage of the bolts therethrough irrespective of the curvature of the rails, and the relative positions of the openings to one another. As before, the rails are held in spaced relation by spacers 6c on the bolts 5c. The threaded members 8c in this instance are in the form of conventional carriage bolts and have the usual rectangular necks 80 rectangular in section immediately adjacent their heads 8c'. These bolts project outwardly through longitudinal openings 1c' formed through the guide rail 1c and their necks 80 engage opposite sides of the said openings to prevent the bolts from turning, as shown in FIGURE 16. Carriage bolts as herein shown may be employed in cases where the workpieces A are of such height that they will pass freely beneath the heads 8c'. The arrangement of the nuts 11c and integral sprocket wheels 12c is the same as that shown and described in FIGURES 1 to 4, as is the arrangement of the retainers 16c and 17c for the chain 13c. One of the elongated openings 9c through the supporting rail 4c through which a threaded member 8c extends is shown in FIGURE 15 with a retainer 16c thereon, and FIGURE 17 shows one of the carrier rails 3c having relatively long apertures 3c' therethrough for the passage of bolts 5c.

FIGURES 18 to 21, inclusive, show another modification wherein only a single carrier rail 3d is provided between the guide rails 1d and 2d, and the carrier rail 3d, the supporting rail 4d and the guide rail 2d are adjusted to any desired curved form and are so held by bolts 5d on which spacers 6d are provided. The guide rail 1d is of course held concentric with the supporting rail 4d by the threaded members 8d and the nuts 11d. In this case again the threaded members are shown in the form of carriage bolts.

While in the foregoing the preferred embodiments of the invention have been described and shown, it is understood that further alterations and modifications may be made thereto provided these alterations and modifications fall within the scope of the appended claims.

What we claim is:

1. Chuting comprising spaced longitudinal guide rails, at least one carrier rail along which workpieces are adapted to travel extending longitudinally between the guide rails, said guide rails projecting upwardly above the carrier rail, a longitudinal supporting rail outwardly spaced from at least one of the guide rails, a plurality of transverse fastening means having spacers thereon holding the outer rail on each side of the chuting uniformly spaced from the carrier rail throughout the length of said rails, a plurality of adjustable holding means connecting the supporting rail and the guide rail adjacent thereto and including means whereby said holding means includes threaded members held against rotation by the guide rail and projecting outwardly through openings formed through the supporting rail, springs between the guide rail and the supporting rail tending to force said rails apart, nuts on said threaded members outwardly of the supporting rail, a sprocket integral with each nut, an endless chain engaging all the sprockets, and means for turning one of the sprockets whereby they are all turned simultaneously.

2. Chuting comprising spaced longitudinal guide rails, carrier rails along which workpieces are adapted to travel extending longitudinally between the guide rails, said guide rails projecting upwardly above the carrier rails, a longitudinal supporting rail outwardly spaced from one of the guide rails, a plurality of longitudinally spaced bolts extending through openings formed in the supporting rail, the carrier rails and the guide rail remote from the supporting rail, spacers on the bolts for retaining the rails through which said bolts extend uniformly spaced from one another throughout their length, adjustable holding means connecting the supporting rail and the guide rail adjacent thereto including means whereby the spacing between said rails may be adjusted, said adjustable holding means including threaded members held against rotation by the guide rail and projecting through the supporting rail, helical springs around the threaded members tending to force the supporting rail and the guide rail apart, nuts on the outer extremities of the threaded members for adjusting the spacing between said rails, sprockets integral with the nuts, an endless chain extending around all of the sprockets, a second sprocket mounted for rotation coaxially with one of the first-named sprockets, and a second endless chain extending around and depending from said second sprocket operable to rotate the same and actuate the remaining sprockets simultaneously.

3. The combination set forth in claim 1 characterized in that two longitudinal supporting rails are provided, one spaced outwardly from each guide rail, and each supporting rail is provided with said transverse fastening means supporting the guide rail remote therefrom, and each supporting rail is provided with said plurality of adjustable holding means supporting the guide rail adjacent thereto for adjustment transversely with respect to its cooperating guide rail, and the several said adjustable holding means of each supporting rail are coupled together for simultaneous adjustment.

4. Chuting comprising spaced longitudinal guide rails, at least one carrier rail along which workpieces are adapted to travel extending longitudinally between the guide rails, said guide rails projecting upwardly above the carrier rail, a longitudinal supporting rail outwardly spaced from at least one of the guide rails, a plurality of transverse fastening means having spacers thereon holding the outer rail on each side of the chuting uniformly spaced from the carrier rail throughout the length of said rails, a plurality of adjustable holding means connecting the supporting rail and the guide rail adjacent thereto and including means whereby said guide rail may be adjusted relatively with respect to the cooperating guide rail to vary the transverse distance therebetween, and operating mechanism is provided coupling a multiplicity of said adjustable holding means together whereby said multiplicity of adjustable holding means may be actuated simultaneously to adjust said guide rail with respect to the cooperating guide rail to vary the transverse distance therebetween.

References Cited in the file of this patent

UNITED STATES PATENTS

| | | |
|---|---|---|
| 1,644,999 | Hardiman | Oct. 11, 1927 |
| 2,004,349 | Schwab | June 11, 1935 |
| 2,704,144 | Rety et al. | Mar. 15, 1955 |
| 2,717,682 | Cadman | Sept. 13, 1955 |
| 2,815,841 | Dabich | Dec. 10, 1957 |